United States Patent
Nakamura et al.

(10) Patent No.: US 7,068,275 B2
(45) Date of Patent: Jun. 27, 2006

(54) METHODS AND APPARATUS FOR RENDERING AN IMAGE WITH DEPTH-OF-FIELD DISPLAY

(75) Inventors: Tadashi Nakamura, Yokohama (JP); Dylan Simon Cuthbert, Tokyo (JP)

(73) Assignee: Sony Computer Entertainment, Inc. (JP)

(*) Notice: Subject to any disclaimer, the term of this patent is extended or adjusted under 35 U.S.C. 154(b) by 0 days.

(21) Appl. No.: 10/649,295

(22) Filed: Aug. 27, 2003

(65) Prior Publication Data

US 2004/0036687 A1    Feb. 26, 2004

Related U.S. Application Data

(62) Division of application No. 09/515,663, filed on Feb. 29, 2000, now abandoned.

(30) Foreign Application Priority Data

Mar. 1, 1999    (JP) ................... P11-53397

(51) Int. Cl.
   *G06T 11/00*    (2006.01)

(52) U.S. Cl. ..................................... 345/428
(58) Field of Classification Search ........... 345/428, 345/581, 582, 606, 609, 611, 646, 647
   See application file for complete search history.

(56) References Cited

U.S. PATENT DOCUMENTS

| 5,365,277 | A | 11/1994 | Greggain |
| 5,396,594 | A | 3/1995 | Griffith et al. |
| 5,559,905 | A | 9/1996 | Greggain et al. |
| 5,684,939 | A | 11/1997 | Foran et al. |
| 6,111,584 | A | 8/2000 | Murphy |
| 6,236,405 | B1 | 5/2001 | Schilling et al. |
| 6,275,234 | B1 | 8/2001 | Iwaki |
| 6,348,925 | B1 | 2/2002 | Potu |

FOREIGN PATENT DOCUMENTS

WO    WO 96/5684939    11/1997

OTHER PUBLICATIONS

Potmesil et al., Synthetic Image Generation with a Lens and Aperture Camera Model, 1982, ACM, pp. 85-108.*
Max et al., A Two-and-a-Half-D Motion-Blur Algorithm, 1985, ACM, pp. 85-93.*

(Continued)

*Primary Examiner*—Almis R. Jankus
(74) *Attorney, Agent, or Firm*—Lerner, David, Littenberg, Krumholz & Mentlik, LLP

(57) ABSTRACT

A depth of field rendering apparatus, method and program displays a sense of distance using a Z buffer to establish a depth direction of objects in an image and generating an image in a just-in-focus state while writing a Z value of each of dots in the image into the Z-buffer. A blurred image is produced from the just-in-focus image and portions of the blurred image are selectively overwritten on the just-in-focus image by comparing a preset Z value to the Z value of each of the data in the Z buffer.

21 Claims, 16 Drawing Sheets

OTHER PUBLICATIONS

Foley et al., Comuter Graphics Principles and Practice, 1996, pp. 859-860.*

Goss {"Multi-Dimensional Polygon-Based Rendering for Motion Blur and Depth of Field": Brunel University, 1991}, chapters 4, 6 and 7.

Asada et al., "Calibrated Computer Graphics: A New Approach to Realistic Image Synthesis Based on Camera Calibration", Proceedings of the 14th Conference Pat. Rec., Brisbane, Queensland, Australia, Aug. 16-20, 1998, pp. 705-707.

Rokita, P., "Fast Generation of Depth of Field Effects in Computer Graphics", Computers and Graphics, vol. 17, No. 5, Sep. 1, 1993, pp. 593-595.

* cited by examiner

| R | G | B | Z | A |
|---|---|---|---|---|
| 8 | 8 | 8 | 32 | 8 |
FIG. 1A
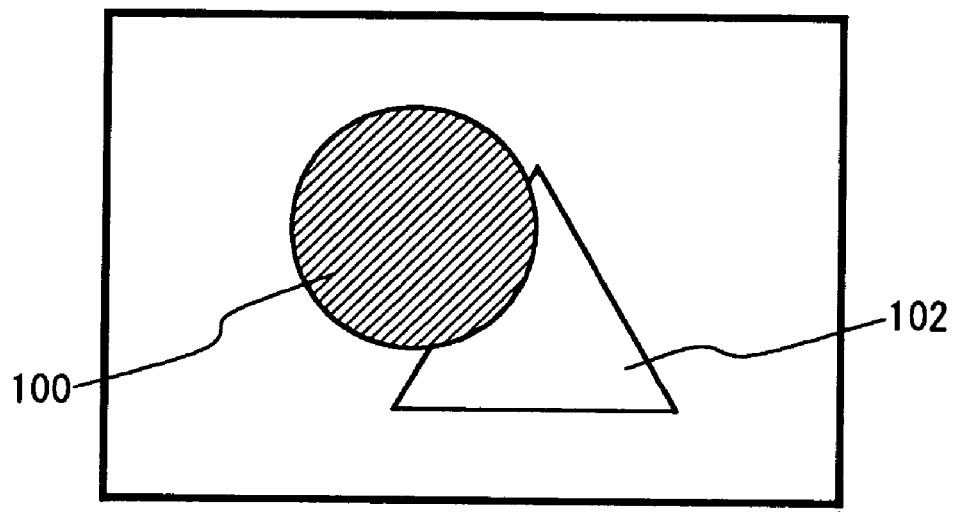
FIG. 1B
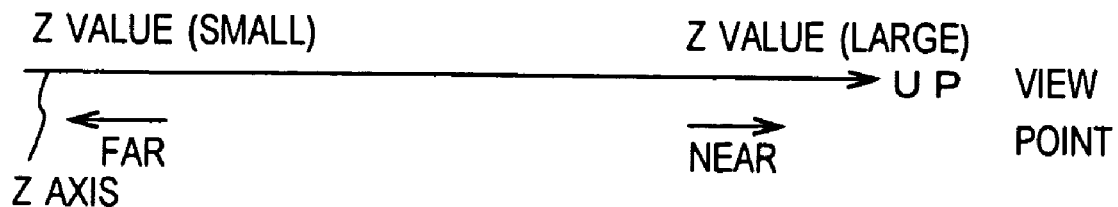
FIG. 1C

POINT-SAMPLING METHOD (ORIGINAL IMAGE)

(FIRST-STEP REDUCTION)

(SECOND-STEP REDUCTION)

BILINER-FILTER METHOD (SECOND-STEP REDUCTION)

(AFTER MAGNIFICATION)

1/2 REDUCED IMAGE

1/4 REDUCED IMAGE

1/8 REDUCED IMAGE

1/16 REDUCED IMAGE

METHODS AND APPARATUS FOR RENDERING AN IMAGE WITH DEPTH-OF-FIELD DISPLAY

CROSS-REFERENCE TO RELATION APPLICATIONS

The present application is a divisional of U.S. application Ser. No. 09/515,663 filed Feb. 29, 2000 now abandoned, the disclosure of which is incorporated by reference herein, and which claims priority to Japanese Application No. P11-53397 filed Mar. 1, 1999.

BACKGROUND OF THE INVENTION

The present invention relates to a rendering apparatus and a rendering method for showing depth of field and a storage medium for storing a data-processing program for the rendering method.

Conventionally, to allow three-dimensional objects to be rendered, entertainment systems, such as TV game apparatuses perform perspective transformations so that the objects can be displayed on two-dimensional screens. In this case, processing such as light-source computation is also performed so as to display the objects three-dimensionally.

To date, however, there has been no method for showing depth of field giving a sense of distance in the direction from the viewpoint to the object (Z direction).

SUMMARY OF THE INVENTION

In view of the problems described above, the present invention provides a rendering apparatus capable of showing depth of field. Furthermore, the invention provides a depth-of-field display method for displaying a sense of distance from a viewpoint to objects on a two-dimensional screen. Still Furthermore, the present invention provides a data-processing program for displaying the sense of distance from the viewpoint to the objects on the two-dimensional screen.

A rendering apparatus of the present invention comprises a device for generating an image in an out-of-focus state by using an original image in a just-in-focus state, reducing the original image, and thereafter, magnifying the reduced image.

Also, the rendering apparatus of the invention comprises: a Z-buffer for setting the depth direction of pixels and a pixel-interpolation algorithm and further comprises a device for presetting a Z value of the abovementioned Z-buffer; a device for generating an image in a out-of-focus state by reducing an original image in a just-in-focus state, and thereafter, magnifying the reduced image; and a device for overwriting the abovementioned image in the out-of-focus state on the abovementioned original image by using the abovementioned preset Z value. In the above, the described rendering apparatus turns an image field of an object corresponding to the point represented by the abovementioned Z value to the just-in-focus state, and concurrently, turns an image field of an object other than the abovementioned object to the out-of-focus state, thereby showing depth of field.

The above-described rendering apparatus of the present invention which uses the abovementioned device for generating the image in the out-of-focus state by reducing the abovementioned original image and then magnifying the reduced image sequentially reduces the abovementioned original image and, thereafter, magnifies the reduced images, thereby generating the images in out-of-focus states. In this case, it is preferable that the abovementioned pixel-interpolation algorithm is a bilinear filter method.

Also, the rendering apparatus of the present invention further comprises alpha planes for selectively masking the pixels. The rendering apparatus uses the abovementioned preset Z value to sequentially reduce the abovementioned original image, to overwrite out-of-focus and blurred images obtained by magnifying the reduced images on the abovementioned original image, and to turn image fields of objects located farther than a point represented by the abovementioned Z value. The described rendering apparatus also uses the abovementioned alpha planes to mask the image fields of the objects located farther than the point represented by the abovementioned Z value, thereafter, to overwrite the abovementioned out-of-focus and blurred images on the abovementioned original image, and to turn image fields located nearer than the point represented by the abovementioned Z value to out-of-focus states.

It is preferable that the above rendering apparatus further comprises a video RAM (VRAM) having a rendering area and a texture area in the same memory space to sequentially reduce the abovementioned original image in the abovementioned VRAM and, thereafter, to magnify the reduced images, thereby generating the abovementioned out-of-focus and blurred images.

Also, the rendering apparatus comprises: Z-buffer for setting the depth direction of pixels and a pixel-interpolation algorithm and further comprises a device for presetting a Z value of the abovementioned Z-buffer;

A device for generating multiple out-of-focus images each having a unique out-of-focus level by reducing an original image in a just-in-focus state to images each having a unique linear ratio, and thereafter, magnifying images thereby reduced; and A device for using the abovementioned preset Z value to overwrite the abovementioned out-of-focus image on the image in the just-in-focus state, of which the abovementioned out-of-focus level is increased corresponding to an increase in its distance from a point represented by the abovementioned Z value, on the original image. The abovementioned rendering apparatus turns an image field of an object located at a point corresponding to the abovementioned Z value to the just-in-focus state, and concurrently, turns an image field of an object other than the abovementioned object to the out-of-focus state wherein the abovementioned out-of-focus level is increased corresponding to an increase in its positional distance from the point represented by the abovementioned Z value, thereby generating images showing depth of field.

Furthermore, an image-generating method of the present invention comprises steps for preparing an original image in a just-in-focus state, reducing the abovementioned original image, and magnifying the reduced image, thereby generating an image in an out-of-focus state.

Also, the image-generating method of the invention comprises steps for preparing an original image in a just-in-focus state, sequentially reducing the abovementioned original image, and magnifying the reduced images, thereby generating images in out-of-focus states.

Also, the image-generating method of the invention comprises steps for preparing an original image in a just-in-focus state, sequentially reducing the abovementioned original image to images each having a unique linear ratio, and individually magnifying the reduced images each having the unique linear ratio, thereby generating a plurality of out-of-focus images each having a unique blurred level.

Also, the depth-of-field display method of the invention comprises steps for using a pixel-interpolation algorithm to reduce an original image, and thereafter, to magnify the reduced image, thereby generating a blurred and out-of-focus image; and for using a Z-buffer capable of controlling the distance in the depth direction from a viewpoint, thereby overwriting the abovementioned out-of-focus image on the abovementioned original image.

Also, the depth-of-field display method of the invention comprises steps for using a pixel-interpolation algorithm to sequentially reduce an original image, and thereafter, to magnify the reduced images, thereby generating out-of-focus images; and for using alpha planes having a masking function to mask image fields of objects located farther than a point represented by a preset Z value and to overwrite the abovementioned out-of-focus images on the abovementioned original image that has been masked, thereby turning image fields that have not been masked to out-of-focus states.

Also, the depth-of-field display method of the present invention comprises steps for using a pixel-interpolation algorithm to sequentially reduce an original image, and thereafter, to magnify the reduced images, thereby generating images in out-of-focus states; for using a Z-buffer capable of controlling the distance in the depth direction from a viewpoint to overwrite the abovementioned images in the out-of-focus states on the abovementioned original image, thereby turning image fields of objects farther than the point represented by a preset Z value to out-of-focus states; and for using alpha planes having a masking function to mask the image fields of the objects located farther than the point represented by the abovementioned preset Z value and to overwrite the abovementioned images in the out-of-focus states on the abovementioned original image, thereby turning image fields that have not been masked to out-of-focus states.

In addition, the depth-of-field display method comprises steps for turning image of objects located at a position corresponding to a preset Z value to a just-in-focus state and overwriting images of which levels of out-of-focus states are sequentially increased corresponding to an increase in their positional distances to one of a farther direction and a nearer direction from a point represented by the abovementioned preset Z value; for using a pixel-interpolation algorithm to perform sequential reductions of an original image, and thereafter, to perform magnification of the reduced images, thereby generating the abovementioned images in the out-of-focus states; and for controlling levels of the abovementioned out-of-focus states according levels of the abovementioned sequential reductions.

Still furthermore, a storage medium of the present invention stores an image-generating program so as to be readable and executable by a computer. The image-generating program comprises steps for preparing an original image in a just-in-focus state, reducing the abovementioned original image, and magnifying the reduced images, thereby generating images in out-of-focus states.

Also, the storage medium of the present invention which stores the image-generating program so as to be readable and executable by a computer, wherein the image-generating program comprises steps for preparing an original image in a just-in-focus state, sequentially reducing the abovementioned original image to images each having a unique linear ratio, and individually magnifying the reduced images each having a unique linear ratio, thereby generating a plurality of out-of-focus images each having a unique blurred level.

Also, the storage medium of the present invention, which stores the image-generating program so as to be readable and executable by a computer, wherein the image-generating program comprises steps for using a pixel-interpolation algorithm to sequentially reduce an original image, and thereafter, to magnify the reduced images, thereby generating images in out-of-focus states; for using a Z-buffer capable of controlling the distance in the depth direction from a viewpoint to overwrite the abovementioned out-of-focus images on the abovementioned original image, thereby turning image fields of objects farther than a point represented by a preset Z value to out-of-focus states; and for using alpha planes having a masking function to mask the image fields of the objects located farther than the point represented by the abovementioned preset Z value and to overwrite the abovementioned images in the out-of-focus states on the abovementioned original image, thereby turning image fields that have not been masked to out-of-focus states.

Also, the storage medium of the invention, which stores the image-generating program so as to be readable and executable by a computer, wherein the image-generating program comprises steps for using a pixel-interpolation algorithm to reduce an original image, and thereafter, to magnify the reduced image, thereby generating a blurred and out-of-focus image; and for using a Z-buffer capable of controlling the distance in the depth direction from a viewpoint, thereby overwriting the abovementioned out-of-focus image on the abovementioned original image.

Also, the storage medium of the invention which stores the image-generating program so as to be readable and executable by a computer, wherein the abovementioned image-generating program comprises steps for using a pixel-interpolation algorithm to sequentially reduce an original image, and thereafter, to magnify the reduced images, thereby generating out-of-focus images; and for using alpha planes having a masking function to mask image fields of objects located farther than a point represented by a preset Z value and to overwrite the abovementioned out-of-focus images on the abovementioned original image that has been masked, thereby turning image fields that have not been masked to out-of-focus states.

Also, the storage medium of the present invention, which stores the image-generating program so as to be readable and executable by a computer, wherein the image-generating program comprises steps for using a pixel-interpolation algorithm to sequentially reduce an original image, and thereafter, to magnify the reduced images, thereby generating out-of-focus images; for using a Z-buffer capable of controlling the distance in the depth direction from a viewpoint to overwrite the abovementioned out-of-focus images on the abovementioned original image, thereby turning image fields of objects farther than a point represented by a preset Z value to out-of-focus states; and for using alpha planes having a masking function to mask image fields of objects located farther than the point represented by the abovementioned preset Z value and to overwrite the abovementioned out-of-focus images on the abovementioned original image, thereby turning image fields that have not been masked to out-of-focus states.

Also, the storage medium of the present invention, which stores the image-generating program so as to be readable and executable by a computer, wherein the abovementioned image-generating program comprises steps for turning image of objects located at a position corresponding to a preset Z value to a just-in-focus state and overwriting images of which levels of out-of-focus states are sequentially increased corresponding to an increase in their positional distances to one of a farther direction and a nearer direction from a point represented by the abovementioned preset Z value; for using a pixel-interpolation algorithm to perform sequential reductions of an original image, and thereafter, to perform magnification of the reduced images, thereby generating the abovementioned images in the out-of-focus states; and for controlling levels of the abovementioned out-of-focus states according levels of the abovementioned sequential reductions.

In addition, in the above, the abovementioned preset Z value may be serially varied per image.

BRIEF DESCRIPTION OF THE DRAWINGS

FIGS. 1A to 1C are views used to explain alpha bits;

DESCRIPTION OF THE PREFERRED EMBODIMENT

Figure 2A:
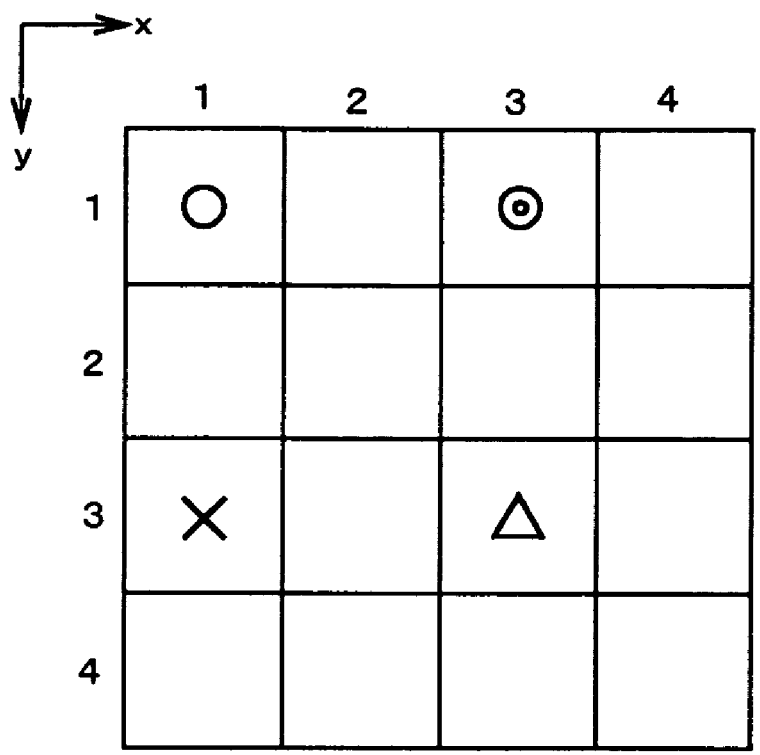
FIGS. 2A and 2B are views used to explain a point-sampling method.

In image generation processing, a depth-of-field display method of the present invention is implemented with an image-processing system, such as an entertainment system, for example, a game apparatus, that preferably satisfies the following conditions:

The system has a Z-buffer that can control a Z direction (depth direction) of individual pixels;

The system is capable of alpha-mask processing (having an alpha filter); and in addition, The system has a bilinear filter.

However, as described below, in an entertainment system, when an image on which predetermined processing has been provided (which is referred to as a processed image, hereinbelow) is overwritten, if the system has no hardware restrictions such the Z-buffer permits selective overwriting only when its capacitance is smaller than (or larger than) a preset Z value, and the Z-buffer permits optional and selective overwriting when its capacitance is smaller than or larger than the preset Z value, condition (ii), namely that the system is capable of alpha-mask processing, may be unnecessary.

Hardware employed in this embodiment is preferably a video RAM (VRAM) with a Z-buffer. In particular, as shown in FIG. 1A, individual dots (pixels) are specified in the VRAM. For example, in addition to R (red), G (green), and B (blue) color elements of 8-bit values, the VRAM has areas for storing a Z value of up to 32 bits and an A value ("alpha bits", or "alpha planes") of up to 8 bits.

The Z value is a parameter that represents distance from the viewpoint up to an object. In perspective transformation in a graphic processing unit (GPU), when a perspective transformation is carried out for a three-dimensional object to an object on a two-dimensional screen, the distance (depth information) from the viewpoint is also computed, and the Z value is determined according to the depth information. At this time, the R, G, and B values are also determined by light-source computation.

For example, as shown in FIGS. 1B and 1C, when an object 100 is arranged relatively nearer to the viewpoint, the Z value of dots that compose the object 100 is set to be large. In contrast, when the object 100 is arranged relatively farther from the viewpoint, the Z value of dots that compose the object 100 is set to be small. At this time, by making use of the Z value, the depth from the viewpoint of the object (value of the viewpoint coordinate system in the z-axis direction) can be determined.

Accordingly, in the generation of an image composed of multiple objects in one screen, when a Z value (for example, a mean Z value between a Z value of the object 100 and a Z value of an object 102) is preset, and a processed image (an image created by performing processing on the original image) is overwritten on the original, a portion of an image corresponding to the object 100 whose Z value is determined to be relatively large (that is, relatively nearer from the viewpoint) as a result of comparison to the preset Z value remains unchanged (that is, the portion is not transformed in the units of pixels). On the other hand, a portion of an image corresponding to the object 102 whose Z value is determined to be relatively small (that is, relatively farther from the viewpoint) can be generated as an image overwritten on a processed image (that is, the portion is transformed in units of pixels).

In this way, the Z-buffer can be used in the generation of an image composed of multiple objects in the depth direction.

The alpha value A shown in FIG. 1A is a parameter for controlling a combination of pixel colors and also for performing masking processing for the entire image or a part of an image. The masking processing refers to, for example, processing that performs selective execution by which a masked image area is not colored in coloration of an image.

In this way, in overwriting a processed image on the original image, according to the provision of the alpha value A in the original image, dots are thereby masked (dots for which mask bits are turned on) and are not overwritten with the processed image.

Generally, conventional TV game apparatuses employ a point-sampling method for magnifying or reducing images.

Figure 2B:
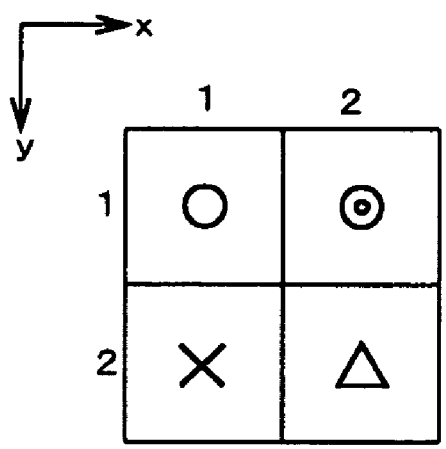

The point-sampling method is briefly described below with reference to FIGS. 2A and 2B. FIG. 2A shows the original image (that is, a pre-reduction image). FIG. 2B shows an image after reduction by a linear ratio of 1/2 (area ratio of 1/4). To make the explanation concise, the image in FIG. 2A is assumed to be composed of 4×4 dots, that is 16 pixels, and the image in FIG. 2B is composed of 2×2 dots, that is four pixels. Also, in order to specify the position of the pixels, the horizontal direction of each image is set to be an x-axis direction, and the vertical direction thereof is set to be a y-axis direction, wherein the position of the right upper dot of each image is represented as (x, y)=(1, 1). In FIG. 2A, each of the 16 dots is signified by R, G, and B values; however, to make the explanation concise, only the four dots shown therein are represented by symbols ○, ⊚, x, and Δ.

In the point-sampling method, to generate a post-reduction dot at (x, y)=(1, 1), the position of the post-reduction dot at (x, y)=(1, 1) is first computed, then, a dot whose position is nearest thereto is retrieved from in corresponding pre-reduction areas at (x, y)=(1, 1), (1, 2), (2, 2), this case, if the position nearest to the post-reduction dot at (x, y)=(1, 1) is assumed to be the dot in the pre-reduction area of (x, y)=(1, 1), the dot represented by 0 represents the contents of the post-reduction dot at (x, y)=(1, 1). Similarly, to generate a post-reduction dot at (x, y) (2, 1), the position thereof is first computed, then, a dot whose position is nearest thereto is retrieved from the four dots in corresponding pre-reduction areas at (x, y)=(3, 1), (4, 1), (3, 2), and (4, 2). In this case, if the position nearest to the post-reduction dot represented by (x, y)=(2, 1) is assumed to be the dot in the pre-reduction area at (x, y) (3, 1), the dot represented by the symbol © represents the contents of the post-reduction dot at (x, y)=(2, 1).

Similarly to the above, dots represented by the symbols x and A represent post-reduction dots at (x, y)=(1, 2) and (x, y)=(2, 2), respectively. That is, the point-sampling method eliminates unnecessary dots (pixels) from a pre-reduction image to generate a post-reduction image. Therefore, among dots composing the pre-reduction image, those not used for the post-reduction image are discarded.

According to the above, even though an image reduced by the point-sampling method is magnified, since the pre-reduction image information is partly discarded, an image including noise is simply magnified, thereby producing a mosaic image.

Figure 3A:
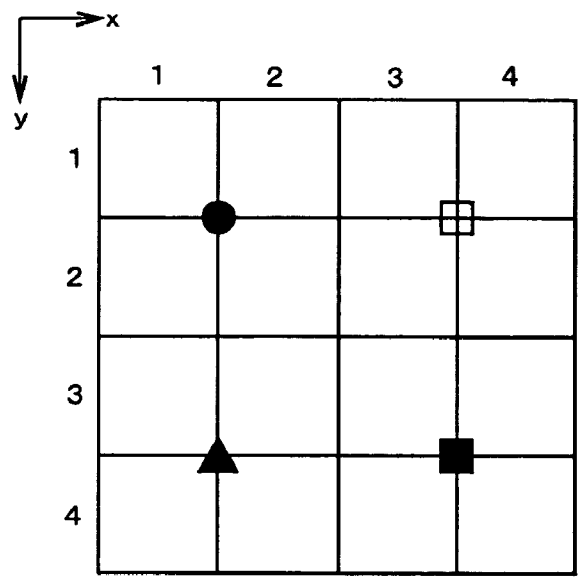
FIGS. 3A to 3C are views used to explain a bilinear filter method.
Figure 3B:
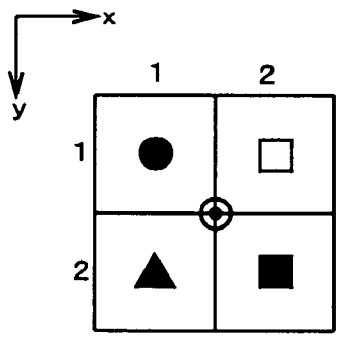
Figure 3C:
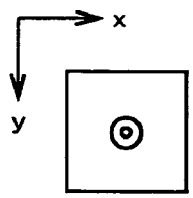

Next, a description will be given of a bilinear filter method that performs reducing/magnifying processing in a different manner from the point-sampling method. FIGS. 3A to 3C are used for explaining the bilinear filter method. FIG. 3A shows the original image (pre-reduction image) composed of 4×4 dots. FIG. 3B shows a first-stage post-reduction image composed of 2×2 dots. FIG. 3C shows a second-stage post-reduction image composed of one dot. Also, the 16 dots representing the image in FIG. 3A are signified with R, G, and B values; however, to make the explanation concise, an average value of the four-upper left dots is represented by the symbol ●, an average value of the four-lower left dots is represented by the symbol ▼, an average value of the four-upper right dots is represented by the symbol □, and an average value of the four-lower right dots is represented by the symbol ■.

To generate a dot of the first-stage post-reduction image at (x, y)=(1, 1), the bilinear filter method uses the average value (●) of the four dots in the corresponding pre-reduction areas in FIG. 3A, that is, at (x, y)=(1, 1), (2, 1), (1, 2), and (2, 2). Similarly, to generate a post-reduction dot at (x, y)=(2, 1), the method uses the average value (□) of the four dots in the corresponding pre-reduction areas in FIG. 3A, that is, at (x, y)=(3, 1), (4, 1), (3, 2), and (4, 2).

Similarly, the bilinear filter method uses the average value (▼) of the four dots in the pre-reduction areas (x, y)=(1, 3), (2, 3), (1, 4), and (2, 4) to generate a post-reduction dot (x, y)=(1, 2). Also, the method uses the average value (■) of the four dots in the pre-reduction areas (x, y)=(3, 3), (4, 3), (3, 4), and (4, 4) to generate a post-reduction dot (x, y)=(2, 2). Here, to make the explanation concise, an average value of the above four average values (■, □, ▼, and ■) is assumed to be represented by symbol ⊚.

In addition, to perform a second-stage reduction (linear ratio of 1/4), the bilinear filter method uses the average value ⊚ of the four dots shown in FIG. 3B.

According to the point-sampling method described first, the number of dots corresponding to the difference between the number of dots composing the pre-reduction image and the number of dots composing the post-reduction image is discarded in reducing processing. That is, a post-reduction image is generated, in which tens of percent of the pre-reduction image information is not used. However, the bilinear filter method is different from the point-sampling method in that it makes use of all dots (information) composing the pre-reduction image, thereby generating the post-reduction image.

Nevertheless, the bilinear filter method is still furnished with predetermined restrictions in the algorithm. For example, when the scale is smaller than a linear ratio of 1/2, the algorithm of the method uses an average value of four dots composing a pre-reduction image, which corresponds to one dot composing a post-reduction image. Accordingly, to reduce a pre-reduction image, to for example, an image at a linear ratio of 1/16, a single reduction processing looses tens of percent of pre-reduction image information. As a result, when the image reduced at a ratio of 1/16 is magnified back to an image of the original size, the magnified image includes noise.

However, by reducing the pre-reduction image step-by-step at linear ratios of 1/2, 1/4, 1/8. 1/16, and so forth in relation to the original image, it can be theoretically said that an image in which the complete information of the pre-reduction image is reduced to an intended resolution is produced.

Figure 4A:
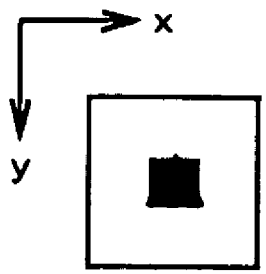
FIGS. 4A and 4B are views used to explain individual cases where bilinear filters are used to sequentially reduce images and, thereafter, to magnify the reduced images.

Therefore, for example, as shown in FIG. 4A, to magnify an image reduced at a ratio of 1/4 to the original image (this magnifying processing is performed once), dots are combined depending on distance, and interpolation is performed. In the case of a real image, an image is never composed of a single dot. For example, in magnifying an image of 2×2 dots shown in FIG. 3B to an image of 4×4 dots shown in FIG. 3A, positions at four points corresponding to a post-magnification image shown in FIG. 3A are individually set to be ●, □, ▼, and ■, according to dots ●, □, ▲, and ■ in pre-magnification positions ●, □, ▼, and ■ shown in FIG. 3A, individual dots around these found points are generated according to interpolation performed depending on the distance from the individual points by use of the set values.

Compared to images reduced or magnified according to the point-sampling method presently used, the method using the bilinear filter can reproduce images that are blurred (i.e., images that are out of focus) and are smoothed according to interpolating processing. A description will be given of the above with reference to FIG. 5 and an example of a combined VRAM that has a rendering area 501, a plurality of work areas 0 to n (reference symbols 502 to 505), and the like in the same memory space. First, an image in the VRAM rendering area 501 (original image) is reduced sequentially in multiple steps at linear ratios of 1/2, 1/4, 1/8, and so forth by use of the work areas 502 to 505, thereby creating an image having an final resolution of $(1/2)^{n+1}$ of the original image.

According to the step-by-step reductions at a ratio of 1/2, when a pixel-interpolation algorithm, such as the bilinear filter method, is applied to an image-reducing algorithm, a reduced image for which all the information in the original image has been sampled can be generated.

In a sense, the above phenomenon is similar to a case where, for example, an image (original image) displayed in 600 dpi (dots per inch) is scanned at 400 dpi (in this case, however, the image is not physically reduced), is next scanned at 200 dpi (in this case as well, the image is not physically reduced), and thereafter, the 200-dpi image is reproduced as an image of 600 dpi. For example, although the 200-dpi image contains the complete information of the original image, the reproduced 600-dpi image is smoother than the original image. A characteristic similar to the above case is that the image is blurred according to the fact that the resolution is once reduced.

The linear ratio of 1/2 is simply an example, and there are no restrictions thereto. That is, the restriction to the effect—when the scale is smaller than the linear ratio of 1/2, an average value of four pre-reduction dots corresponding to one post-reduction is assumed—is simply a restriction in the algorithm employed in this embodiment. For example, suppose an algorithm such as that when an image is reduced at a linear ratio of 1/4, an average value of 16 pre-reduction dots is used, and the complete dot information on a pre-reduction image is used in reduction. In this case, restrictions below the linear ratio of 1/2 in the reduction are unnecessary.

It has been discovered that an image showing depth of field can be generated by reducing an image step-by-step, magnifying and reproducing the image and by making use of the reproduced image that is smoothed and blurred.

It is known that when an reproduced image created by reducing the original image (pre-reduction image) step-by-step, then magnifying the reduced image is overwritten on the entire part of one screen, the entire screen is displayed in an out-of-focus (blurred) state.

Hereinbelow, discussion will be given of a first case where the Z-buffer is used to generate an image that contains a plurality of objects each having a unique Z value (that is, the distance to object from the viewpoint is unique), wherein an object relatively farther is displayed in a blurred state (out-of-focus or defocus state), and an object relatively nearer is displayed in a just-in-focus state.

Figure 6:
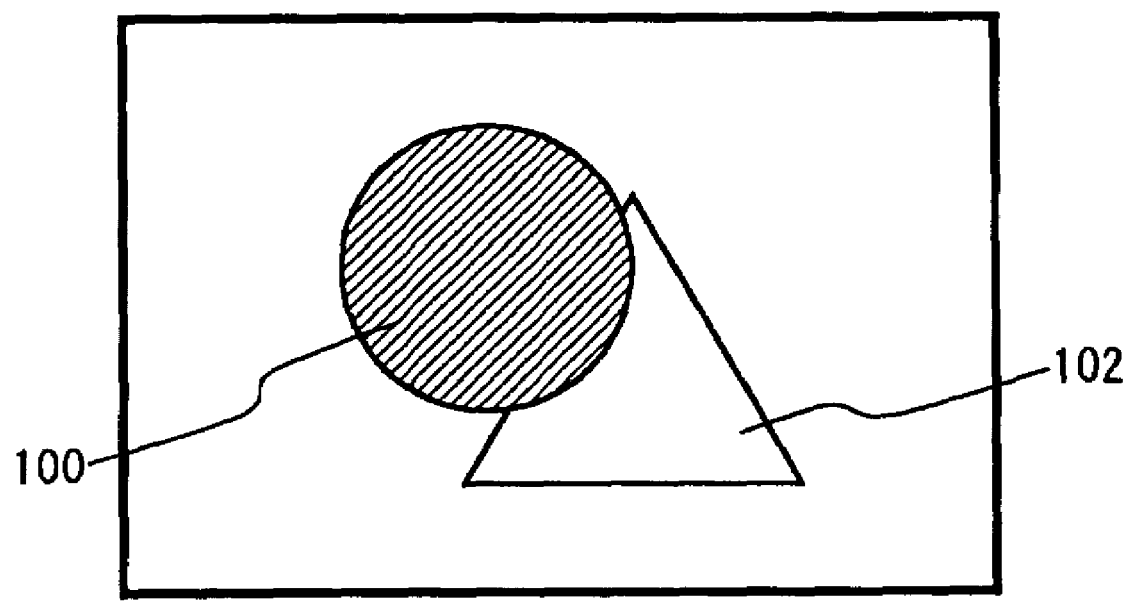
FIG. 6 is a view used to explain a case where a Z value is used to overwrite a smoothed and blurred image on an original image.

As shown in FIG. 6, a case is assumed such that a screen contains at least an object 102 located relatively farther and an object 100 located relatively nearer. In this case, a relationship occurs such that dots composing the object 100 located relatively nearer have a large Z value on average, whereas dots composing the object 102 located relatively farther have a small Z value on average.

Figure 7:
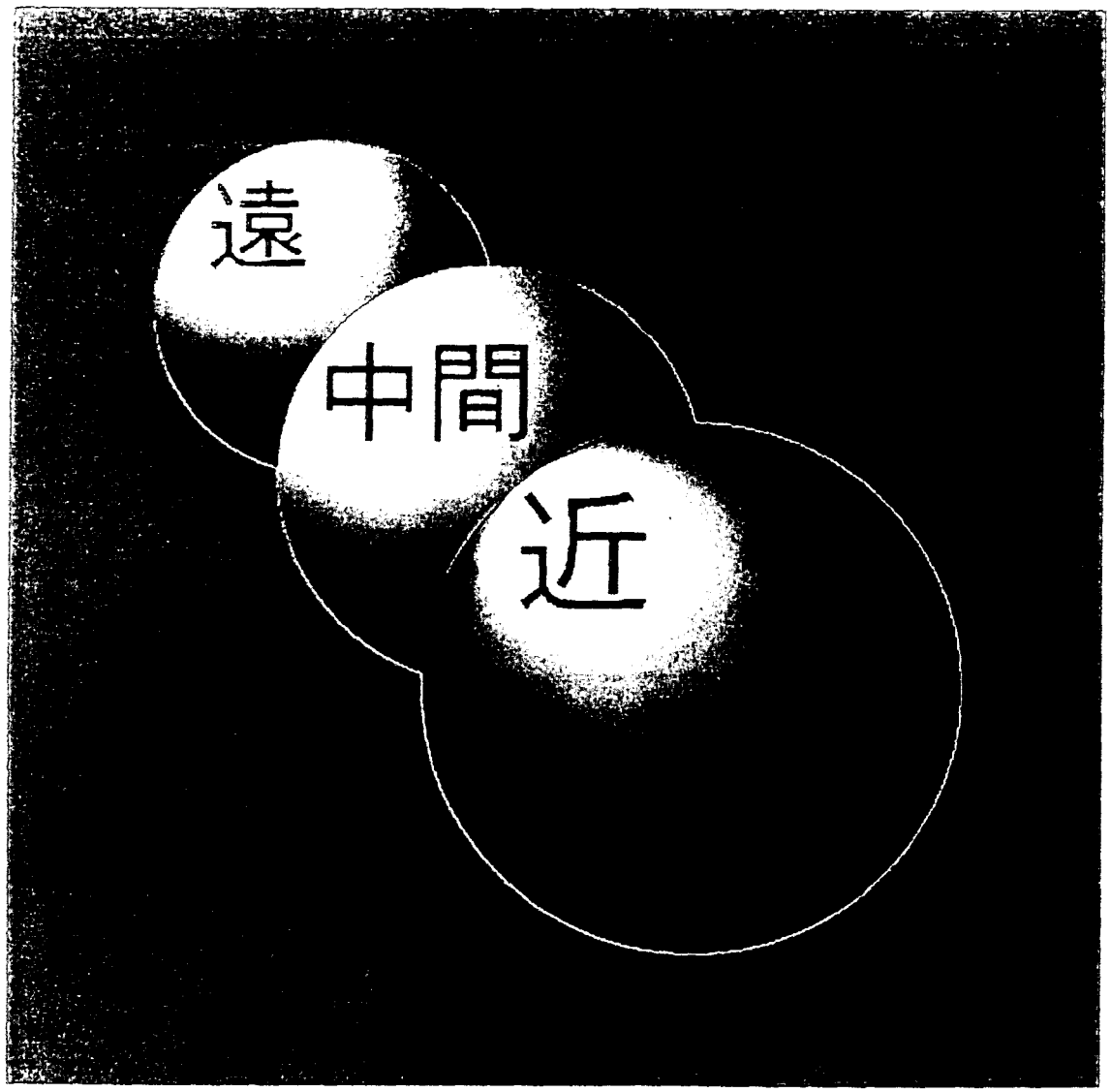
FIG. 7 shows an original image stored in a VRAM rendering area.
Figure 8:
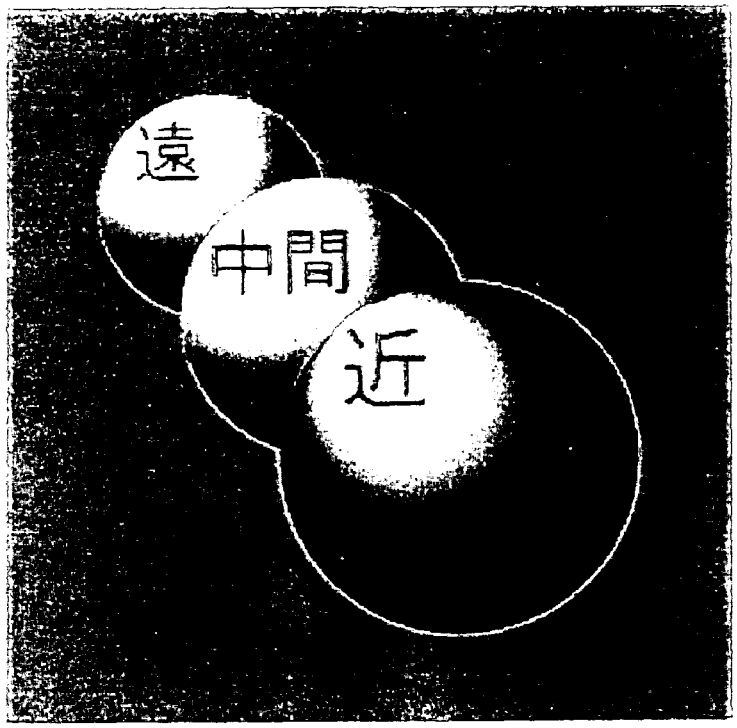
FIG. 8 shows a case where an original image is sequentially reduced.
Figure 8:
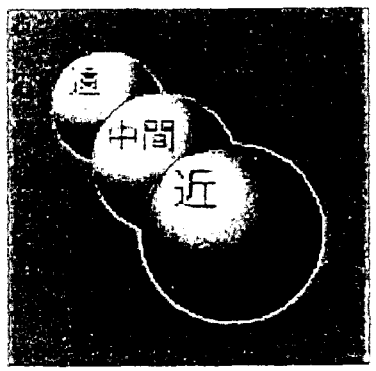
Figure 8:
Figure 8:
Figure 9:
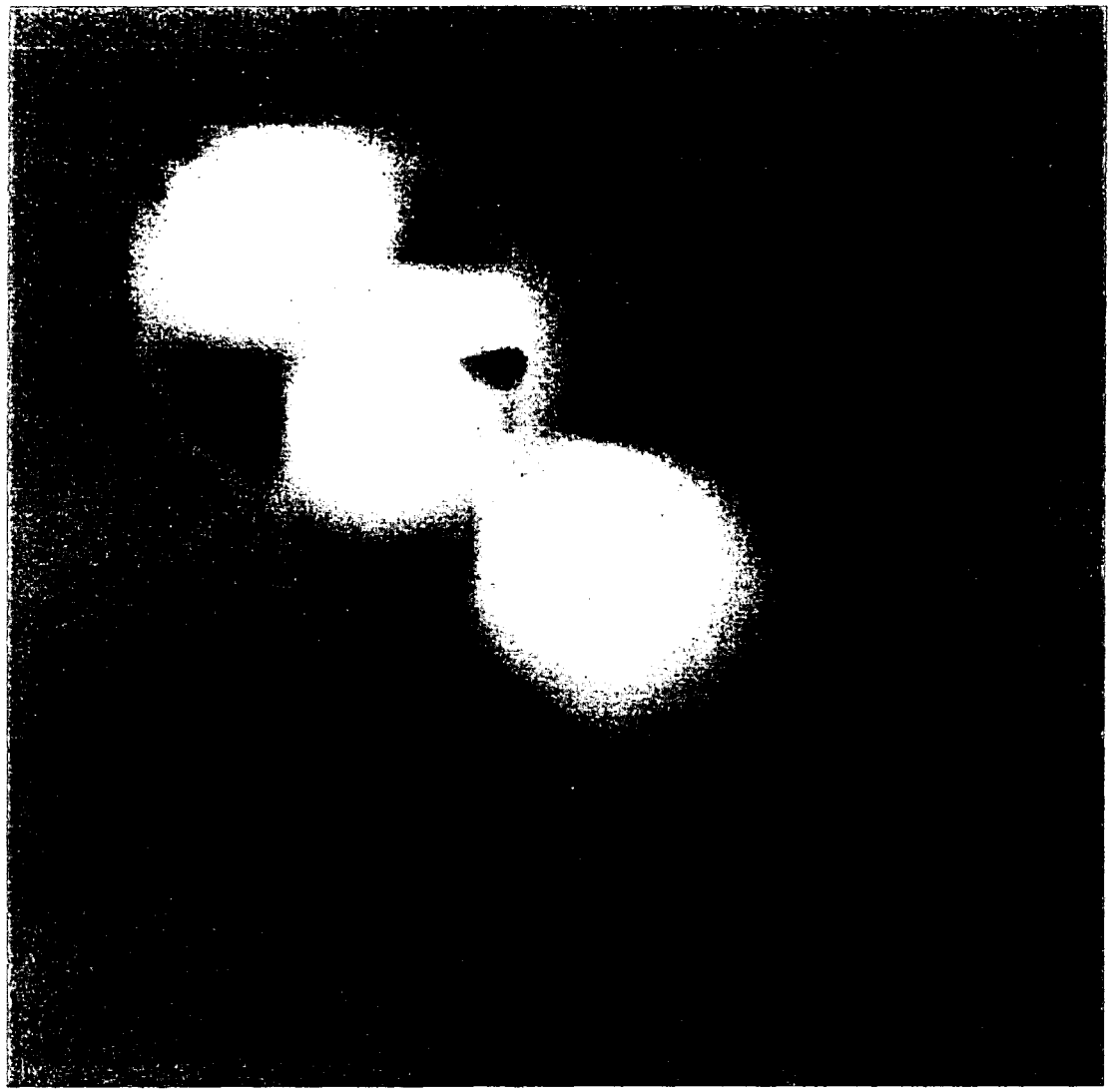
FIG. 9 shows a case where an original image is sequentially reduced to $\frac{1}{16}$ and, thereafter, is magnified.

FIG. 7 shows an image (image-1) in the just-in-focus state, containing multiple objects. The Chinese characters "遠", "中間" and "近" of each object mean Far, Intermediate and Near, respectively. With reference to FIG. 8, this image is reduced step-by-step, as described above. Subsequently, the image is magnified, thereby generating a smoothed and blurred image (image-2) (refer to FIG. 9).

The above-described Z-buffer compares the large-and-small relationship of Z values of individual dots. By use of these Z values, a Z value that is near the Z value of the object 100 located relatively nearer is preset. According to the preset value, the blurred image (image-2) is then overwritten on the image (image-1) that is in the just-in-focus state. According to a Z-buffer in an entertainment system currently being developed, processing in a single direction is implemented such as that an image field of an object located farther than a point represented by the preset Z value (small Z value) is overwritten. On the other hand, an image field of an object located relatively nearer (point represented by a large Z value) remains not overwritten.

Figure 10:
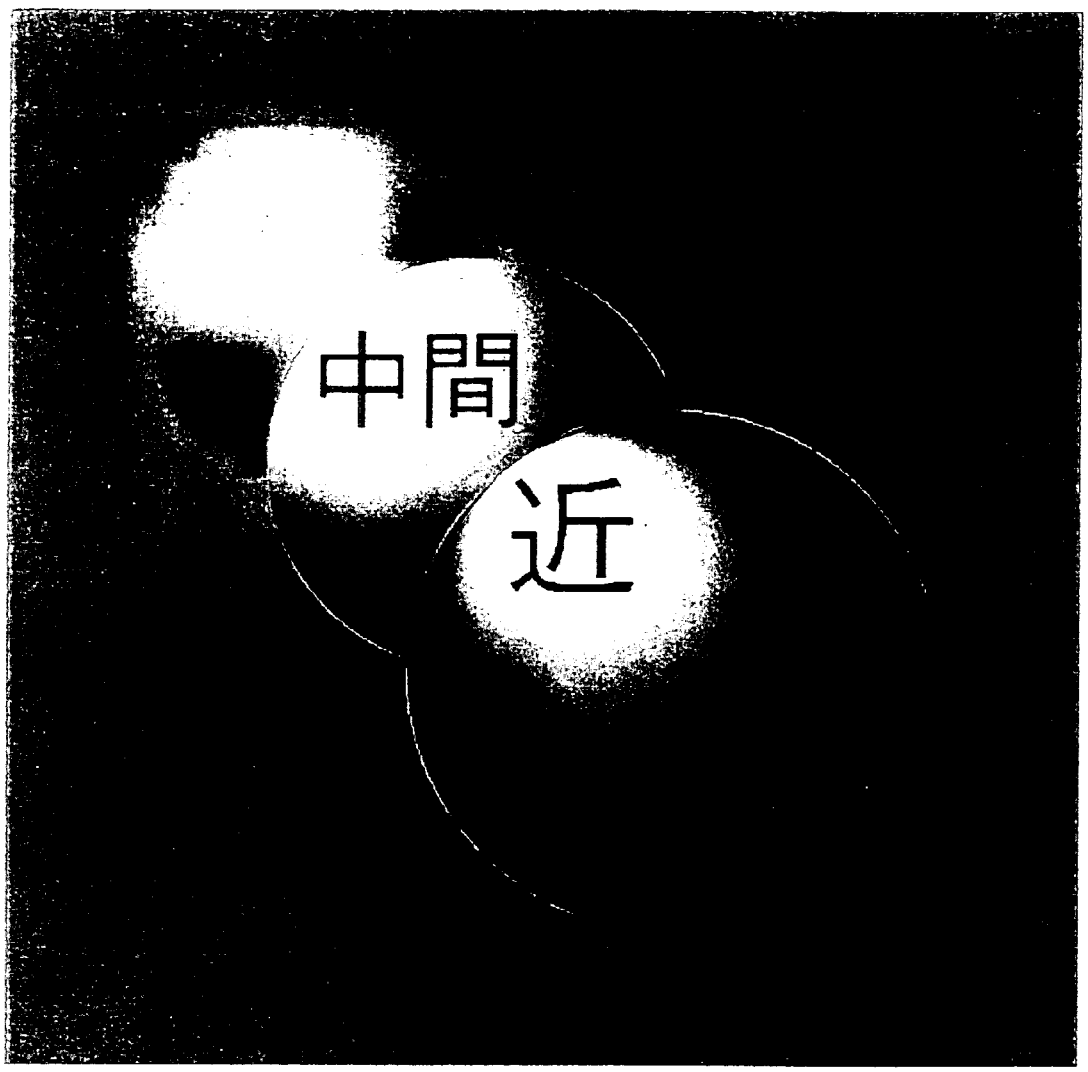
FIG. 10 shows a case where a Z-buffer is used to the original image in FIG. 9 is sequentially reduced to $\frac{1}{16}$, and thereafter, the reduced image is magnified and is overwritten on the original image in FIG. 7.

As a result of the above single-direction processing, multiple objects can be generated so as to be displayed on a screen in which an object located relatively farther is in the blurred state. However, an object located relatively nearer is in the just-in-focus state (refer to FIG. 10).

The final resolution image is outputted to the original VRAM rendering area 501 by use of a pixel-interpolation algorithm (for example, the bilinear filter method).

At this time, by setting an appropriate value to the Z value, only pixels located farther than a point represented by the Z value are overwritten as an image at a reduced resolution. This allows production of images that are in the blurred state when they are located farther than the border of the Z value.

Hereinbelow, discussion will be made for a second case where the Z-buffer is used to generate an image that contains a plurality of objects each having a unique Z value (that is, the distance to the object from the viewpoint is unique), wherein an object relatively farther is displayed in the just-in-focus state, and an object relatively nearer is displayed in the blurred state (i.e., opposite to the first case discussed above).

Originally, in a processing system that allows inversely setting of the Z value (a processing system that does not allow overwrite of pixels located relatively farther), an image field located nearer than a point represented by a preset Z value can be overwritten so as to be an image having a reduced resolution. As a result, the nearer portion of the image is displayed in the blurred state.

As described above, however, with the Z-buffer currently being developed according to determination made by comparison of Z values, an image located relatively nearer (when the Z value is large) can remain not overwritten, and an image located relatively farther (when the Z value is small) can be overwritten. Nevertheless, the Z-buffer serves with restrictions in the opposite case. According to this Z-buffer, the object located relatively nearer (when the Z value is large) can be overwritten, whereas the object located relatively farther remains not overwritten.

In the described processing system that does not allow inverse setting of Z values, masking processing can be implemented by use of the alpha bit (refer to FIG. 1A), and control can be implemented whether or not overwriting is performed. This allows the short side to be overwritten in the following manner:

1) Paint out only alpha-mask planes composed of pixels represented by rendering-VRAM Z values, which are located farther than a point represented by a preset Z value. That is, the planes are masked.

2) Set an alpha-plane testing condition so that only pixels that are not covered with masks are overwritten.

3) Overwrite an image of which resolution is reduced.

As a result of the above, pixels not covered with masks of the alpha planes, that is, only the pixels whose distances are nearer than the point represented by the preset Z value, are overwritten as an image whose resolution is reduced. This is described below in more detail.

Figure 11:
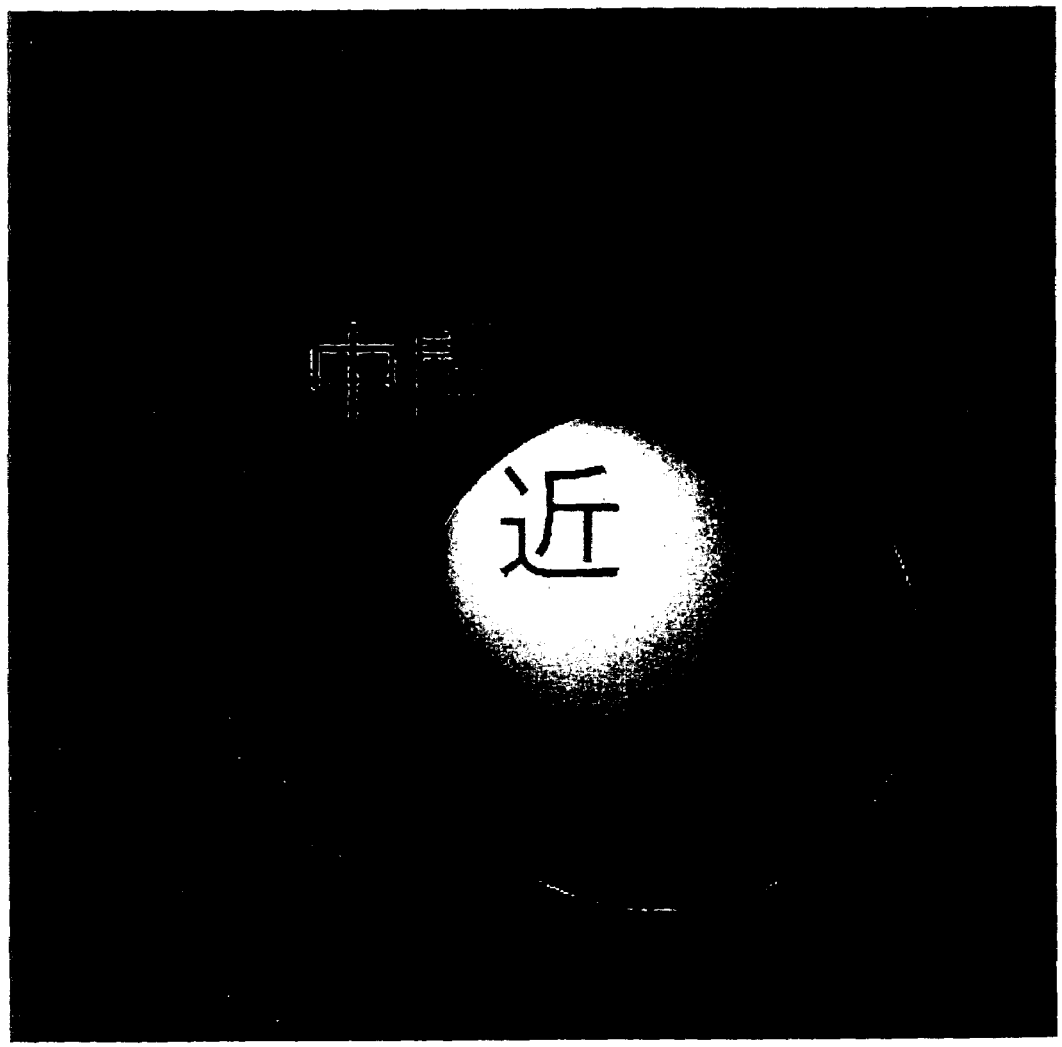
FIG. 11 shows a case where a near Z value (Znear) is specified to paint out mask planes in the VRAM rendering area (The area painted in red for the explanation (area other than the object located near) in this figure is not visible on an actual screen)

First, masking processing is carried out. At the step of the masking processing, the alpha value A is used to cover masks over one image, and the image covered with the masks is overwritten to the original image only for an image field located farther than a point represented by a Z value (a field where the Z value is large). In this case, R, G, and B values are not related and only alpha values A are rendered (which is also expressed as mask bits are turned on.). However, even though the mask bits are turned on, no difference in the images is recognizable to the human eye. In this step, only an image field of an object located relatively farther is overwritten, whereas an image field of an object located relatively nearer remains not overwritten (refer to FIG. 11 and note that areas covered with mask planes are shown in red so as to be quickly identified.).

Subsequently, a blurred image is overwritten onto the image field of the object located relatively nearer. First of all, smoothed and blurred images obtained by step-by-step reductions and magnification performed after the reductions are prepared. Here, in the original image, only an image field of an object located relatively farther is covered with the masks, and an image field of an object located relatively nearer is not covered with the masks. On the other hand, the image field of the object located relatively nearer is overwritten as a smoothed and blurred image.

Figure 12:
FIG. 12 shows a case where the image in FIG. 9 is overwritten on a masked image.

The procedure described above allows generation of a screen on which multiple objects each having a unique Z value are displayed, an object located relatively farther is displayed in the just-in-focus state, and an object located relatively nearer is displayed in the blurred state (refer to FIG. 12).

At the above step, however, overwriting is carried out onto the original image in which only the image field of the object located farther than a point represented by a Z value as the blurred image is overwritten. In this case, a border or a profile of the object located relatively nearer is determined with the Z value in a single definition. For this reason, the profile of an object located relatively nearer is clear, and an image of a smoothed and blurred object is placed within the profile as is fitted therein.

However, as a concept to perform realistic display of the object located relatively nearer in the blurred image, it is more natural to display the object with a blurred profile so as to look expanded. According to this concept, further blurring processing for the distance is performed so as to blur the profile.

At this step, the original image of an object is reduced step-by-step, and then, the reduced image is magnified, thereby allowing a blurred image of the object to be obtained. Here, an object located relatively nearer is conceptually separated into an interior portion and a profile portion. The interior portion is located relatively nearer (the Z value is large), therefore, it is not overwritten. On the other hand, however, since the profile portion slightly expanded because it has been reduced and magnified is not originally given a Z value of the object located relatively nearer, the profile portion is overwritten.

By using the blurred profile portion thus obtained and the described blurred interior portion, both the profile portion and interior portion of the object located relatively nearer are displayed as a smoothed and blurred image.

According to the described bilinear filter method using the Z value and the alpha value A, with a preset Z value (depth), an image field of an object located farther than a point represented by the preset Z value can be blurred, and thereafter, an image field of an object located nearer than that point can be blurred.

By performing the above-described processing in multi-steps, pseudo depth-of-field display with an optical lens can be implemented.

Figure 4B:
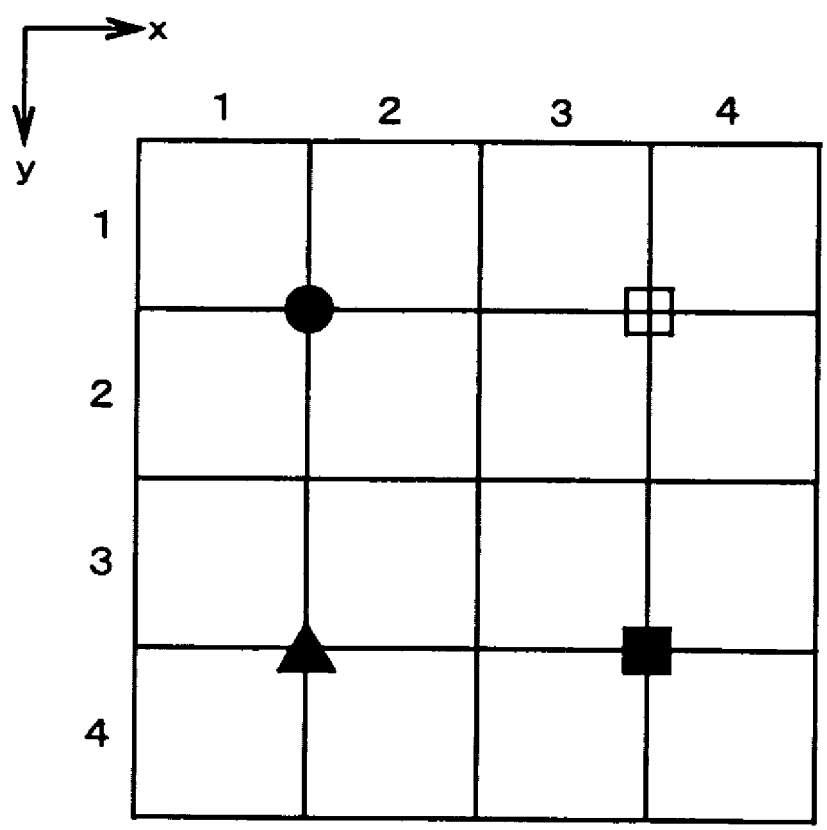
Figure 5:
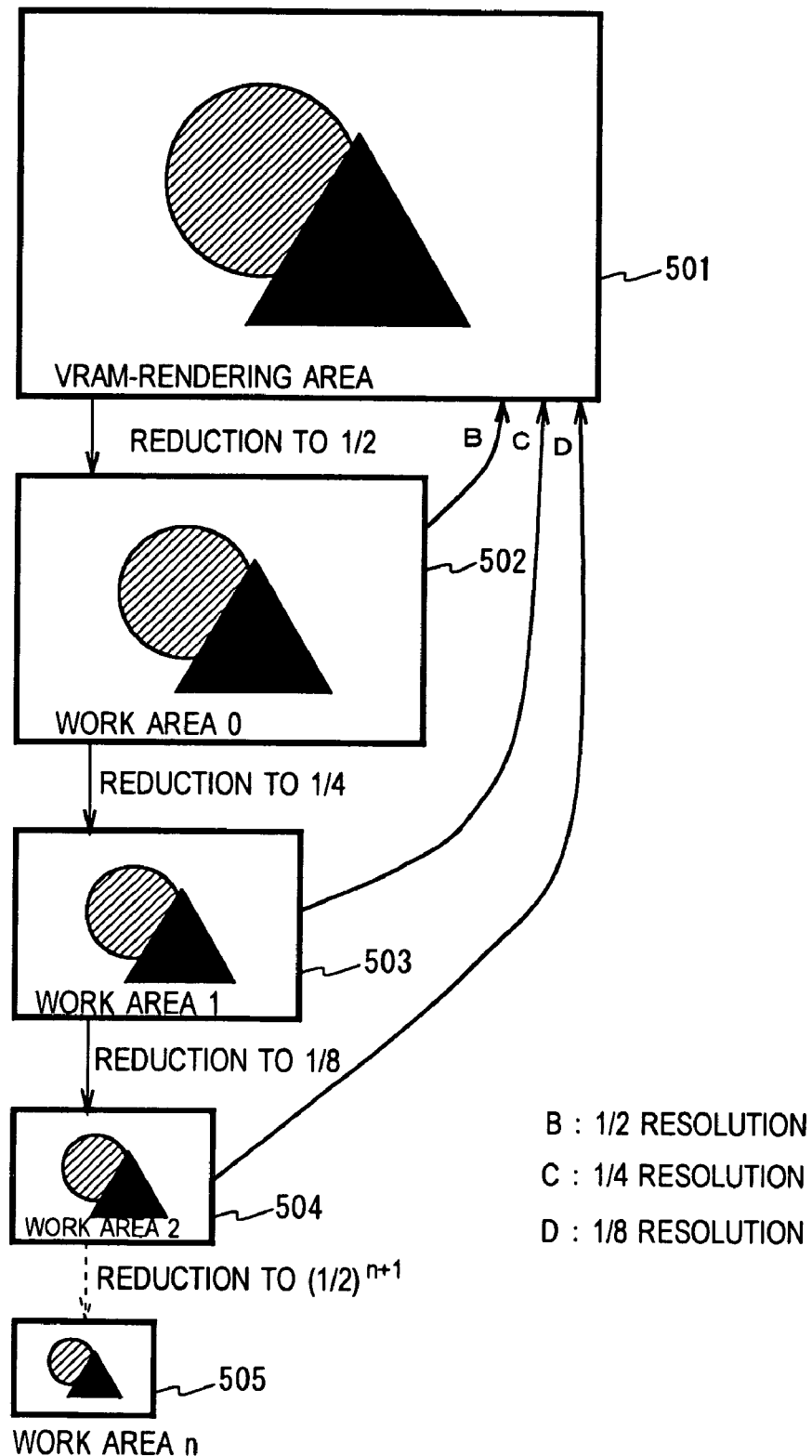
FIG. 5 shows views used to explain a case where the bilinear filters are used to sequentially reduce images and, thereafter, to magnify the reduced images.

The multistep depth-of-field display is described below in detail. By reducing image step-by-step as described with reference to FIG. 3 and then magnifying the reduced images as described with reference to FIG. 4, the image can be smoothed and blurred (refer to FIGS. 8 and 9). At this time, as shown in FIG. 5, the blurred level differs depending upon the reduction level. Suppose there are two images here. One is an image A (having a resolution of 1/16) produced in a manner that an image is reduced step-by-step at ratios of 1/2, 1/4, 1/8, and 1/16, and thereafter, the reduced images are magnified. The other is an image B (having a resolution of 1/4) produced in a manner that an image is reduced step-by-step at ratios of 1/2 and 1/4, and thereafter, the reduced images are magnified. When these two images A and B are compared, it is known that the blur level of the image A is higher than the blurred level of the image B.

By performing reduction and magnification to produce multiple images each having a unique blurred level and by using these images, images showing multistep depth of field can be obtained as described below.

In a single image representing multiple images each having a unique Z value, for example, an object having an intermediate Z value (representing an intermediate depth) is arranged in a just-in-focus state. As arrangement in the direction of depth (depth direction), the blurred level of an object having a Z value smaller than the above (representing a point farther than the above) is sequentially increased according to the level of the depth direction. In contrast, the blurred level of an object having a Z value larger than the above (representing a point nearer than the above) is sequentially increased according to the level of the nearer direction.

In this way, when an object having an preset intermediate Z value is displayed in the just-in-focus state, and when the object is arranged to space far away from and nearer to a point represented by the Z value in the depth direction, an image whose blurred level is sequentially increased can be generated.

Figure 13:
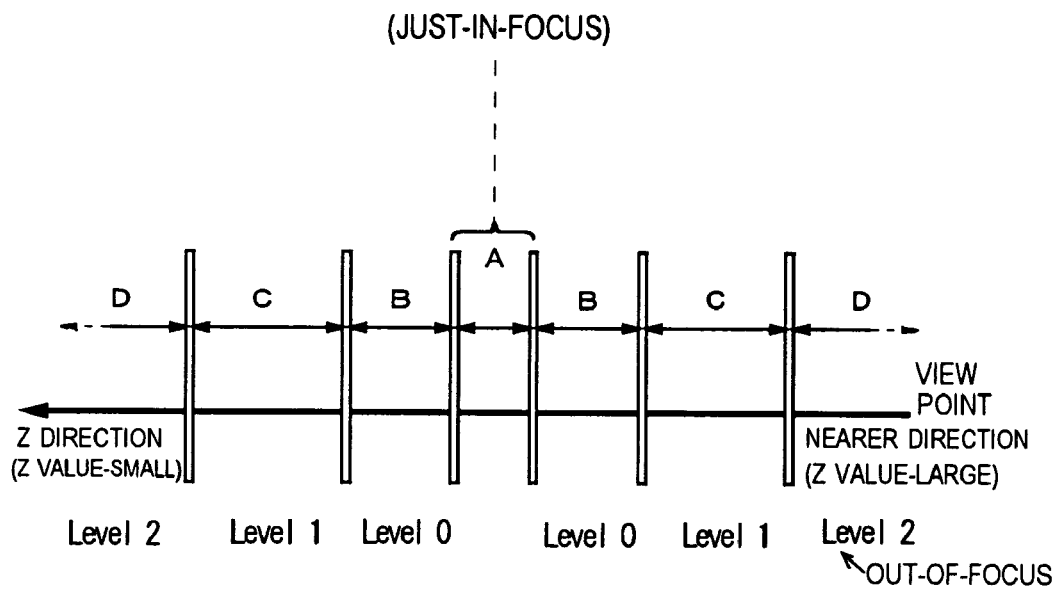
FIG. 13 is a view used to explain a depth-of-field display method.

FIG. 13 shows principles of a method for presenting multistep depth of field.

In particular, as shown in FIG. 13, in the original image, an image field in an area A between Znear[0] and Zfar[0] is in the just-in-focus state.

At a first processing step, the original image is sequentially reduced at ratios of 1/2, 1/4, and 1/8, thereafter, the reduced image is magnified, and the image significantly thereby blurred (blurred level: Level-2) is overwritten onto an image field in areas D that are located nearer to Znear[2] and farther than Zfar[2].

At a second processing step, the original image is sequentially reduced at ratios of 1/2 and 1/4, thereafter, the reduced image is magnified, and the image thereby blurred at an intermediate level (blurred level: Level-0) is overwritten onto an image field in areas C that are located between Znear[2] and Znear[1] and between Zfar[1] and Zfar[2].

At a third processing step, the original image is reduced at a ratio of 1/2, thereafter, the reduced image is magnified, and the image slightly thereby blurred (blurred level: Le s overwritten onto an image field in areas B that are located between Znear[1] and Znear[0] and between Zfar[0] and Zfar[1].

This way allows generation of images that present objects in states significantly blurred step-by-step in two directions, that is, in the depth direction and the closer direction from the preset just-in-focus position.

The number of blurring steps in FIG. 13 can be optionally set corresponding to characteristics of images to be produced. Also, blurred levels of the individual steps can be optionally set according to factors such as an optical knowledge level of a producer (approximated characteristics of optical lenses, image angles, and other characteristics). In addition, lengths of the individual steps can be optionally set.

The just-in-focus position in FIG. 13 can be set to a point of a desired depth from the viewpoint, that is, a desired Z value. Also, as in FIG. 13, the depth direction and the opposite depth direction (nearer direction) may be blurred symmetrically or non-symmetrically, or in a single direction.

By serially displaying multiple images of which the just-in-focus position is serially varied, images of which the depth of field serially varies can be obtained. These images are significantly similar to a case where a microscope is used to observe test pieces, thereby focal points thereof are serially shifted so as to match portions in the depth direction of the test pieces.

Figure 14:
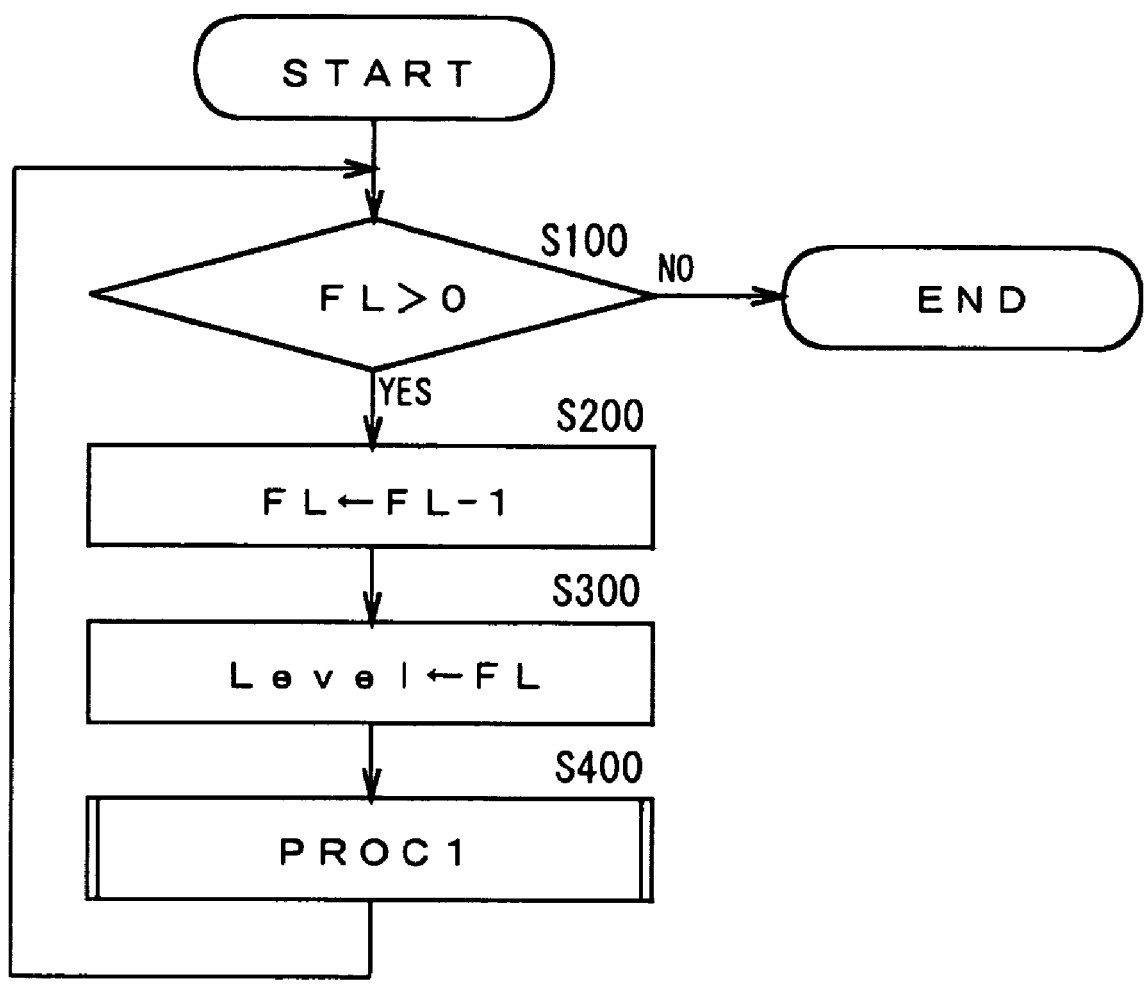
FIG. 14 is a flowchart used to explain steps of the depth-of-field display method in cooperation with flow-charts of FIGS. 15 and 16.

FIG. 14 is a flowchart of generating a still image of an object in a state where the image is displayed significantly blurred sequentially in two directions—the depth direction and the nearer direction—from a preset just-in-focus position.

In the flowchart, FL represents a depth of filtering processing (Note, however, that FL>0.). The depth of filtering processing also represents the number of filters in the area ranging from the just-in-focus position (Zfar[0] to Znear[0]), shown in FIG. 13, to one of the farther direction and the nearer direction, that is, the depth level of the out-of-focus state.

Zfar[0, . . . ,FL−1] represents positions of filters to be applied farther than the just-in-focus position, and Zfar[FL−1] represents that the filter indicated therein is located farther than Zfar[0]. Similarly, Znear[0, . . . , FL−1] represents the position of the filter indicated therein to be applied nearer than Znear[O]. Also, an area sandwiched between Znear[O] and Zfar[O] is not blurred as the area is in the just-in-focus state (just-in-focus area).

As example definitions, FL=1 in the single-step depth-of-field display; and the least number of steps in the multi-step depth-of-field display is two, in which case FL=2. These example definitions are used here so as make the explanation concise.

Step S100 determines whether or not FL representing the depth of the filtering processing is positive. If FL is positive, processing proceeds to the next step. If FL is not positive, processing terminates. For example, since FL=1 in the single-step depth-of-field display, and FL=2 in the simplest-step depth-of-field display, processing proceeds to step S200 in the two cases.

Step S200 assumes FL, which represents the depth of filtering processing, as −1. For example, FL=0 is set in the single-step depth-of-field display, whereas FL=1 is set in the multistep depth-of-field display.

Step S300 assumes FL as the level. Therefore, for example, Level=0 is assumed in the single-step depth-of-field display, whereas Level=1 is assumed in the double-step depth-of-field display.

Step S400 executes processing PROC1. After executing PRO1, processing control returns to step S100. For example, since the single-step depth-of-field display is assumed as FL=0, processing terminates. Also, in the case of the double-step depth-of-field display, since it is assumed as FL=1, step S200 assumes it as FL=0, step S300 assumes it as Level=1, and step S400 reexecutes the processing PROC1 with these values. After the reexecution of the processing PROC1, processing returns to step S100, then terminates.

Figure 15:
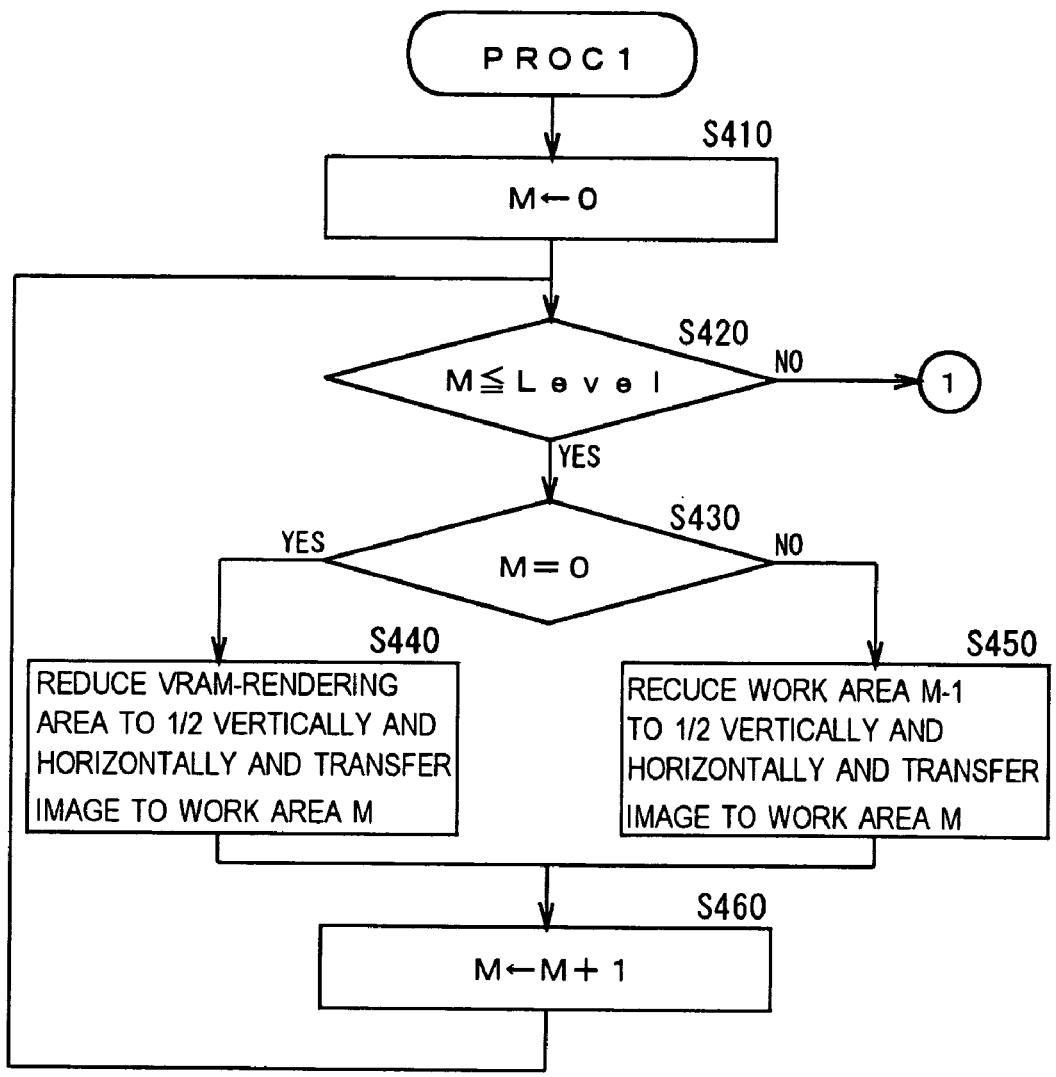
FIG. 15 is a flowchart used to explain steps of the depth-of-field display method in cooperation with flow-charts of FIGS. 14 and 16.

FIG. 15 is a flowchart of processing PROC1 of step S400 shown in FIG. 14. The flowchart covers one run of filtering processing steps, making a loop for executing steps until a counter value M exceeds the level (a value in Level).

Step S410 resets the counter value M to zero.

Step S420 compares the count value M to the level. If the counter value M is the same as or smaller than the level, processing proceeds to step S430. If the counter step S422 in FIG. 16. For example, in the single-step depth-of-field display, since Level=0 and the counter value M=0, processing executes one round of the loop, then proceeds to processing in FIG. 16. However, in the double-step depth-of-field display, since Level=1, processing proceeds to step S430.

Step S430 determines whether or not the counter value is zero. If the counter value M is zero, processing proceeds to step S440. If the counter value M is not zero, processing proceeds to step S450. In this way, the first run of processing proceeds to step S440, and thereafter, processing proceeds to step S450.

Step S440 reduces the VRAM rendering area vertically and horizontally at a ratio of 1/2 and sends the resultant image to a work area M (which is assumed to be a work area-0 in this particular case). The above is performed because the image is stored in the VRAM rendering area in the first run. For example, in the single-step depth-of-field display, processing proceeds to step S440, whereby reducing the VRAM rendering area vertically and horizontally at a ratio of 1/2, then sends the resultant image to the work area-0.

Step S450 reduces a work area M−1 vertically and horizontally at a ratio of 1/2 and sends the resultant image to the work area M. For example, processing proceeds to step S440 in the first run of the loop in the double-step depth-of-field display, then proceeds to step S450 in the second run of the loop. Step 450 reduces the 1/2-reduced image stored in work area-0 vertically and horizontally at a ratio of 1/2, then sends the 1/4-reduced image to a work area-1.

Step S460 increments the counter value M by one, then processing control returns to step S420.

Figure 16:
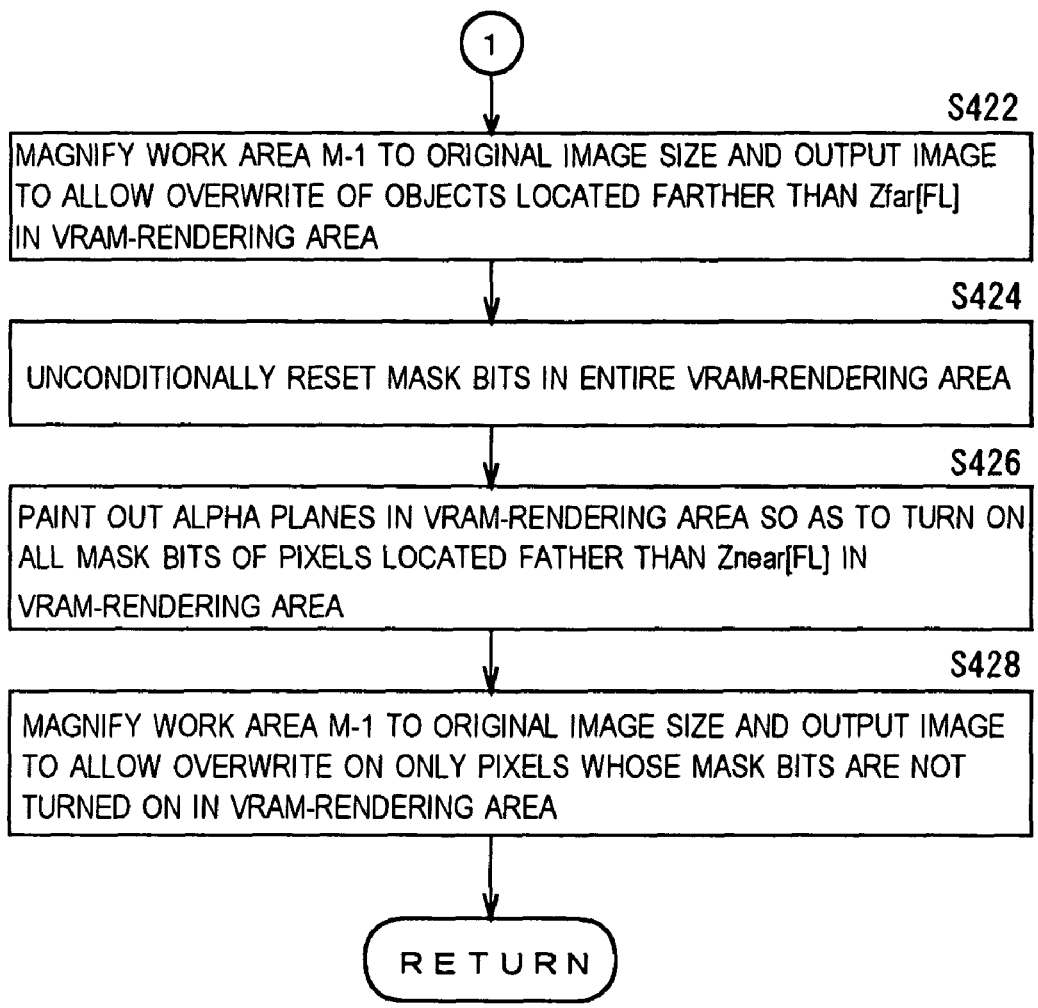
FIG. 16 is a flowchart used to explain steps of the depth-of-field display method in cooperation with flow-charts of FIGS. 14 and 15.

FIG. 16 is a flowchart of image-overwriting processing. The processing shown therein first uses the described Z value and blurs an object located farther than a point represented by a preset Z value. Subsequently, the processing uses the alpha bits (mask bits) and blurs an object located nearer than the point represented by the preset Z value.

Step S422 magnifies the work area M−1 (which contains a finally reduced image) back to the original image size and outputs the resultant image so that an image field located farther than a point represented by Zfar[FL] in the VRAM rendering area is overwritten. For example, in the single-step depth-of-field display, since FL=0 and M=1, step S422 magnifies the work area-0 to the original image size to slightly blur the image (blurred image of 1/2 resolution) so that an image field located farther than a point represented by Zfar[0] in the rendering area is overwritten and blurred.

In the second run of the loop in the double-step depth-of-field display, since FL=1 and M=2, the work area-1 is magnified to the original image size so as to blur the image more significantly (blurred image of 1/4 resolution) so that an image field located farther than a point represented by Zfar[1] is overwritten and blurred.

Step S424 always (unconditionally) clears mask bits in the entire VRAM rendering area. This is preliminary processing to be performed for the mask bits.

Step S426 paints out alpha planes in the VRAM rendering area so that all the mask bits of pixels located farther than a point represented by Znear(FL turn on. For example, in the single-step depth-of-field display, since FL=0 and M=1, pixels located farther than point represented by Znear[0] in the VRAM rendering area are masked so as not to be overwritten. In the second run of the loop in the double-step depth-of-field display, since FL=1 and M=2, pixels located farther than a point represented by Znear[1] in the VRAM rendering area are masked, thereby preventing the overwritten area from spreading wider.

Step S428 magnifies the work area M−1 to an image in the original size and outputs the resultant image so that only pixels of which mask bits are not turned on in the VRAM rendering area are overwritten. Thus, the area not masked is overwritten, and a blurred image of an object located nearer is overwritten thereon. Thereafter, processing control returns to step S420.

As described above, the processing in flowcharts shown in FIGS. 14 to 16 allows generation of a still image in which the image field near the point represented by the preset Z value is displayed in the just-in-focus state. On the other hand, in the still image, the image field located nearer than the point represented by the preset Z value is blurred sequentially corresponding to the distance from the viewpoint, and the image field located farther than the point represented by the preset Z value is also blurred sequentially corresponding to the distance from the viewpoint.

Generating a number of the images of which the Z value is varied depending on the image reduced step-by-step and displaying the multiple images in series on a display (monitor) allows display of images in which the just-in-focus state serially varies. This allows the provision of realistic simulation effects.

The described depth-of-field display method can be applied to an actual data-processing program, for example, in various ways described below.

This depth-of-field display method can be executed with information-processing systems, such as entertainment systems or the like, including personal computers, image-processing computers, and TV game apparatuses, which have a Z-buffer and bilinear filters.

The above embodiment has been described with reference to processing of the method in the VRAM area, but a CPU of a computer can also perform the processing. When using the CPU to implement the method, since processing related to the Z value cannot be optionally determined, there is no restriction such as that, as described above, the Z-buffer functions only in the single direction. Therefore, the CPU does not require the masks (alpha planes) used in the embodiment to blur an image field located nearer than a point represented by a preset Z value.

At present, the display method serially varying the depth of field in real time can be implemented by use of a combined VRAM as a rendering apparatus. In presently available personal computers, speeds for data transfer between a main memory and a VRAM are too low to implement the method of the present invention. Present techniques are still behind in development of buses for performing high-speed transferring of one-image data (for example, data of R, G, and B in 640×480 dots) between graphics circuits.

Also in entertainment systems such as TV game apparatuses, although VRAM rendering area can be reduced without problems, the systems in which texture areas are physically spaced from the VRAM are not suitable to implementation of the method according to the present invention.

In the present technical level, the described display method serially varying the depth of field can be implemented only with a system that has a VRAM in a circuit of graphic processing unit (GPU) and a texture area, a rendering area, and a work area in the VRAM (that is, these areas are available in the same memory space). This system is capable of implementing the described display method because the GPU is capable of performing high-speed processing of the display method serially varying the depth of field.

The depth-of-field display method of the present invention should become able to be implemented not only with the system using the combined VRAM but also with other regular processors when required high-speed data transfer be realized in the course of progress in the related technical field. Therefore, it should be understood that the present invention could be implemented not only with the system using the combined VRAM but also with other processors such as personal computers.

The depth-of-field display method will be supplied to, for example, software manufacturers as a library with software tools. This case enables creation of software that provides game screens showing the depth of field simply by defining parameters, such as Z values, FL values, level values, and Z-value variations.

According to the present invention, a rendering apparatus capable of showing the depth of field can be provided.

Furthermore, the present invention can provide a method for showing the depth of field that gives a sense of distance from the viewpoint to objects.

Still furthermore, present invention can provide a storage medium for storing a data-processing program for displaying the depth of field that giving the sense of distance from the viewpoint to objects on two-dimensional screens.

As above, the present invention has been described with reference to what is presently considered to be the preferred embodiment. However, it is to be understood that the invention is not limited to the described embodiment and modifications. On the contrary, the invention is intended to cover various other modifications and equivalent arrangements included within the spirit and scope of the invention.

The invention claimed is:

1. A rendering apparatus for showing depth of field in an image, comprising:
   (a) a Z buffer operable to establish a depth value of objects in an image;
   (b) an image generator unit to generate an image in a just-in-focus state while writing a Z value of each of dots in the image into the Z buffer;
   (c) a blurring unit operable to produce a blurred image of the image in the just-in-focus state; and
   (d) an overwriting unit operable to selectively overwrite portions of the blurred image on the image in the just-in-focus state by comparing a preset Z value to the Z value of each of the dots in the Z buffer.

2. A rendering apparatus as claimed in claim 1, wherein the preset Z value is changed arbitrarily and continuously with time such that an image field of the objects that are in the just-in-focus state is correspondingly changed.

3. A rendering apparatus as claimed in claim 1, wherein the blurring unit is operable to produce reduced images and to magnify the reduced images to generate out-of-focus images.

4. A rendering apparatus as claimed in claim 3, wherein the blurring unit uses a pixel-interpolation algorithm to produce the reduced images.

5. A rendering apparatus as claimed in claim 4, wherein the pixel-interpolation algorithm comprises a bilinear filter algorithm.

6. A rendering apparatus as claimed in claim 1, wherein the overwriting unit is operable to selectively mask objects corresponding to the preset Z value and to overwrite all un-masked objects with corresponding ones of the out-of-focus images such that objects located farther and nearer than the preset Z value are out of focus.

7. A rendering apparatus as claimed in claim 1, further comprising a video random access memory (VRAM) having a rendering area and a texture area, wherein the blurring unit is operable to produce sequentially reduced images in the VRAM and to magnify the reduced images to generate a plurality of different levels of out-of-focus images.

8. A method for showing depth of field in an image, comprising:
(a) establishing a depth value of objects in an image;
(b) generating an image in a just-in-focus state while writing a Z value of each of dots in the image into a Z buffer;
(c) producing a blurred image of the image in the just-in-focus state; and
(d) selectively overwriting portions of the blurred image on the image in the just-in-focus state by comparing a preset Z value to the Z value of each of the dots in the Z buffer.

9. A method as claimed in claim 8, wherein the preset Z value is changed arbitrarily and continuously with time such that an image field of the objects that are in the just-in-focus state is correspondingly changed.

10. A method as claimed in claim 8 wherein the blurred image is produced by reduced images and magnifying the reduced images to generate out-of-focus images.

11. A method as claimed in claim 10, further comprising using a pixel-interpolation algorithm to produce the reduced images.

12. A method as claimed in claim 11, wherein the pixel-interpolation algorithm comprises a bilinear filter algorithm.

13. A method as claimed in claim 8, objects are selectively masked corresponding to the preset Z value and all un-masked objects are overwritten with corresponding ones of the out-of-focus images such that objects located farther and nearer than the preset Z value are out of focus.

14. A method as claimed in claim 8, wherein the blurring is executed in a video random access memory (VRAM) having a rendering area and a texture area, including producing sequentially reduced images in the VRAM and magnifying the reduced images to generate a plurality of different levels of out-of-focus images.

15. A storage medium for storing an image-generating program capable of execution by a microprocessor to perform steps for showing depth of field in an image, the steps comprising:
(a) establishing a depth value of objects in an image;
(b) generating an image in a just-in-focus state while writing a Z value of each of dots in the image into a Z buffer;
(c) producing a blurred image of the image in the just-in-focus state; and
(d) selectively overwriting portions of the blurred image on the image in the just-in-focus state by comparing a preset Z value to the Z value of each of the dots in the Z buffer.

16. A storage medium as claimed in claim 15, further comprising the step of arbitrarily and continuously changing the preset Z value with time such that an image field of the objects that are in the just-in-focus state is correspondingly changed.

17. A storage medium as claimed in claim 15, wherein the step of producing a blurred image produces reduced images and magnifies the reduced images to generate out-of-focus images.

18. A storage medium claimed in claim 17, wherein the step of producing a blurred image uses a pixel-interpolation algorithm to produce the reduced images.

19. A storage medium as claimed in claim 18, wherein the pixel-interpolation algorithm comprises a bilinear filter algorithm.

20. A storage medium as claimed in claim 15, wherein the step of selectively overwriting selectively masks objects corresponding to the preset Z value and overwrites all un-masked objects with corresponding ones of the out-of-focus images such that objects located farther and nearer than the preset Z value are out of focus.

21. A storage medium as claimed in claim 15, wherein the step of blurring is executed in a video random access memory (VRAM) having a rendering area and a texture area, including producing sequentially reduced images in the VRAM and magnifying the reduced images to generate a plurality of different levels of out-of-focus images.

* * * * *

UNITED STATES PATENT AND TRADEMARK OFFICE
CERTIFICATE OF CORRECTION

PATENT NO. : 7,068,275 B2
APPLICATION NO. : 10/649295
DATED : June 27, 2006
INVENTOR(S) : Tadashi Nakamura and Dylan Simon Cuthbert It is certified that error appears in the above-identified patent and that said Letters Patent is hereby corrected as shown below:

On the title page item (57) under Abstract, line 3, "generating" should read --generates--.
Column 1, line 37, "Furthermore," should read --furthermore,--.
Column 1, line 51, "in a out-of-focus" should read --in an out-of-focus--.
Column 5, line 39, after "is used to" insert --overwrite--.
Column 5, line 40, delete "original".
Column 5, line 40, delete "is sequentially reduced to 1/16, and thereafter, the reduced image is magnified and is overwritten."
Column 8, line 1, "▼" should read --▲--.
Column 8, line 14, "(▼)" should read --(▲)--
Column 8, line 20, "▼" should read --▲--.
Column 8, line 31, "information is not" should read --information are not--.
Column 8, line 42, "image, to for example" should read --image to, for example--.
Column 8, line 63, "▼" should read --▲--.
Column 8, line 64, "▼" should read --▲--.
Column 11, line 10, "value, are" should read --value are--.
Column 12, line 47, "having an preset" should read --having a preset--.
Column 12, line 67, "Level-0" should read --Level-1--.
Column 13, line 5 "Le s" should read --Level-0) is--.
Column 13, line 57, "so as make" should read --so as to make--.
Column 16, line 45, "furthermore, present" should read --furthermore, the present--.
Column 17, line 53, "claim 8, objects" should read --claim 8, wherein objects--.
Column 18, line 34, "medium claimed" should read --medium as claimed--.

Signed and Sealed this

Ninth Day of January, 2007

JON W. DUDAS
*Director of the United States Patent and Trademark Office*